L. ERVING.
Gas Stove.

No. 51,441.

Patented Dec. 12, 1865.

Witnesses:

Inventor:
Luther Erving

UNITED STATES PATENT OFFICE.

LUTHER ERVING, OF BROOKLYN, NEW YORK.

GAS-STOVE.

Specification forming part of Letters Patent No. 51,441, dated December 12, 1865; antedated November 30, 1865.

*To all whom it may concern:*

Be it known that I, LUTHER ERVING, of Brooklyn, in the county of Kings and State of New York, have invented a new and Improved Gas-Stove; and I do hereby declare that the following is a full, clear, and exact description thereof, which will enable those skilled in the art to make and use the same, reference being had to the accompanying drawings, forming part of this specification, in which—

Figure 1:
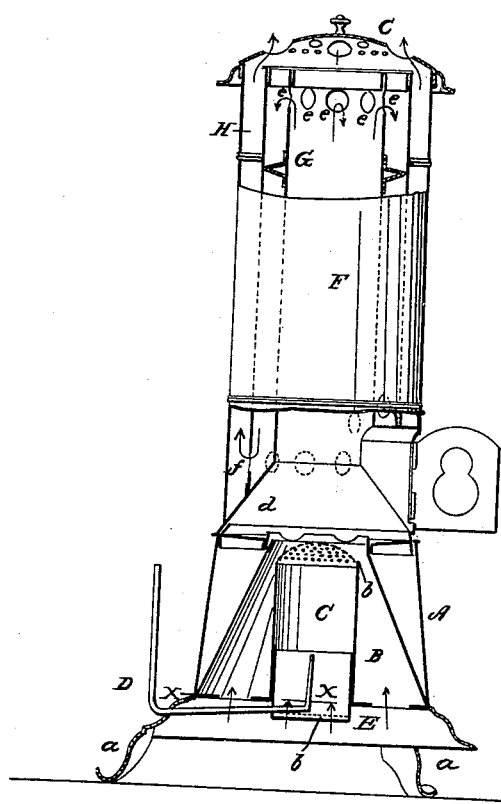
Figure 2:
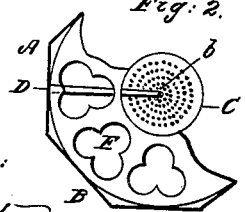

Figure 1 is a side sectional elevation of my invention; Fig. 2, a horizontal section of a portion of the lower part of the same, taken in the line $x\ x$, Fig. 1.

Similar letters of reference indicate corresponding parts.

This invention relates to a new and improved heat-radiating gas-stove; and it consists in the employment or use of a series of cylinders, arranged one within the other, so as to form concentric flues or draft-passages in connection with a gas-burning apparatus, all constructed substantially as hereinafter set forth, whereby it is believed that a large amount of heat will be obtained by a moderate consumption of gas.

A represents the base of the stove, provided with feet $a$, and having within it a conical draft-tube, B, which extends upward to the top of the base.

C represents a cylinder, which is placed centrally within the conical draft-tube B, and has its ends covered with wire-cloth or perforated metal plates $b$. The cylinder C extends up to the top of the draft-tube B, and into the lower said cylinder a gas-pipe, D, passes. The cylinder C is supported by a perforated or skeleton plate, E.

F represents a cylinder, which rests on the base A, and is provided with a perforated top or cap, $c$, and within this cylinder F there is fitted centrally a cylinder, G, considerably less in diameter than F, the lower end of G being connected to the lower end of F by an inclined bottom plate, $d$, as shown in Fig. 1.

H is a cylinder, which is placed between the cylinders F G, concentric therewith. The cylinders G H are closed at their upper ends; but the upper part of G is perforated, as shown at $e$, to form a communication between G and the space between G and H. The lower end of the cylinder H extends down to the inclined bottom plate, $d$, and is perforated, as shown at $f$, to form a communication between the space between G and H and the space between H and F.

The operation is as follows: When the gas is let into the cylinder C it is ignited at the upper surface of the upper perforated plate, $b$, the flame being supplied with air through the draft-tube B and air mingling with the gas by passing into the lower end of C. The draft-tube B, in consequence of being of conical form, causes the air to impinge against the flame, insuring perfect combustion. The inclined bottom plate, $d$, forms a chamber above the base A, which affords abundant space for the consumption of all the gas. The products of combustion pass up the cylinder G, through the perforations $e$ in the upper part of G, down the space between the cylinders G and H, thence through the perforations $f$ in the lower part of H, and up between the cylinders H and F, and out through the perforated top $c$.

By this arrangement a sinuous draft is obtained and a portable heat-radiating gas-stove produced, which may be manufactured at a reasonable expense. These cylinders, in connection with the gas-chamber formed by the cylinder C and the draft-tube B, all arranged as shown, comprise a cheap and efficient heat-radiating gas-stove.

I claim as new and desire to secure by Letters Patent—

The combination of the conical draft-tube B, cylinder C, perforated or reticulated plates $b\ b$ E, and inclined bottom plate, $d$, of the concentric cylinders F G H, all the said parts being constructed and arranged to operate as herein specified.

LUTHER ERVING.

Witnesses:
M. M. LIVINGSTON,
C. L. TOPLIFF.